Dec. 1, 1970     A. W. YODIS ET AL     3,544,633
NEUTRALIZATION OF PERHALOACETONES
Filed Jan. 30, 1967     3 Sheets-Sheet 1

INVENTORS
ANTHONY W. YODIS
AUBREY W. MICHENER JR.
BELA I. KARSAY
BY
Jay P. Friedenson
ATTORNEY

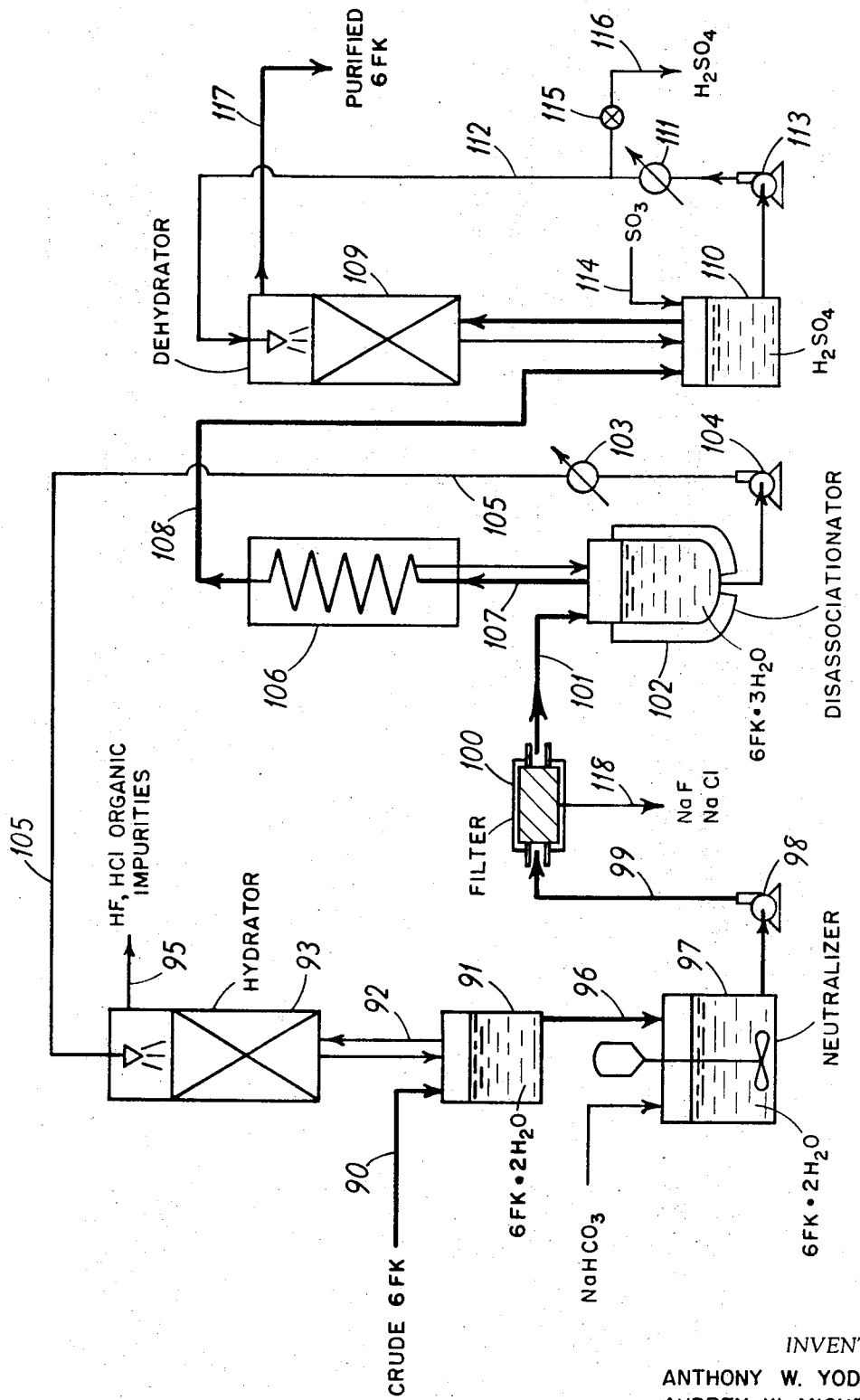

United States Patent Office 3,544,633
Patented Dec. 1, 1970

3,544,633
NEUTRALIZATION OF PERHALOACETONES
Anthony W. Yodis, Whippany, Aubrey W. Michener, Jr., Rockaway, and Bela I. Karsay, West Orange, N.J., assignors to Allied Chemical Corporation, New York, N.Y., a corporation of New York
Filed Jan. 30, 1967, Ser. No. 612,596
Int. Cl. C07c 49/16
U.S. Cl. 260—593                   30 Claims

ABSTRACT OF THE DISCLOSURE

Halogen acid impurities are removed from crude perhaloacetone mixtures by neutralization with certain critically defined salts of polybasic acids. Such salts, e.g. $Na_2CO_3$, $Na_2SO_3$ and $Na_4P_2O_7$, effect removal of halogen acids to high specification standards without causing decomposition of the perhaloacetones. Gross amounts of halogen acids as well as organic impurities may first be removed from crude perhaloacetone masses by forming hydrates and desorbing impurities therefrom. This step may then be followed by neutralization of residual halogen acids with the defined salts by directly treating the hydrates or by treating reconstituted perhaloacetones obtained by dehydration of the hydrates, such as with conc. $H_2SO_4$. Some of the perhaloacetones can be reconstituted by heating their corresponding unstable hydrates to disassociate the same into the corresponding stable hydrates and perhaloacetones.

CROSS-REFERENCES TO RELATED APPLICATIONS

Copending application of William J. Cunningham and Cyril Woolf, entitled "Fluoro Compounds and Synthesis Thereof," Ser. No. 591,034, filed Oct. 31, 1966, now U.S. Pat. 3,374,273, which is a continuation-in-part of copending application of William J. Cunningham and Cyril Woolf, entitled "Fluoro Compounds and Synthesis Thereof." Ser. No. 297,220, filed July 24, 1963, which is in turn a continuation-in-part of copending application of William J. Cunningham and Cyril Woolf, entitled "Fuoro Compounds and Processes for Making Same," Ser. No. 263,430, filed Mar. 7, 1963.

Copending application of William J. Cunningham and Cyril Woolf, entitled "Purification of Perhaloacetones," Ser. No. 580,860, filed Sept. 21, 1966, now U.S. Pat. 3,433,838, which is a continuation-in-part of copending application Ser. No. 297,220, supra.

BACKGROUND OF THE INVENTION

This invention relates to the purification of perhaloacetones from mixtures containing the same together with organic and inorganic impurities, particularly halogen acid impurities.

Perhaloacetones of the formula $C_3OCl_{6-x}F_x$, wherein $x$ is an integer from 1 to 6, and mixtures thereof, hereinafter referred to as "the subject FK's," or simply as "FK's," are a known class of compounds and are known to be useful as intermediates for the preparation of a wide variety of useful chemical compounds such as perhaloacetic acids, perhalogenated alcohols, chlorofluorocarbons, halogenated olefins and halogen containing resins, such as halogen containing polycarbonates.

The subject FK's embraces the following species shown in Table I:

TABLE I

| FK | Chemical name | Chemical formula | Boiling point, °C. |
|---|---|---|---|
| 6FK | Hexafluoroacetone | $CF_3 \cdot CO \cdot CF_3$ | −27.4 |
| 5FK | Chloropentafluoroacetone | $CClF_2 \cdot CO \cdot CF_3$ | 7.8 |
| 4FK | Sym-dichlorotetrafluoroacetone | $CClF_2 \cdot CO \cdot CClF_2$ | 45.2 |
| 4FK | Asym-dichlorotetrafluoroacetone | $CCl_2F \cdot CO \cdot CF_3$ | ~44 |
| 3FK | 1,1,3-trichlorotrifluoroacetone | $CCl_2F \cdot CO \cdot CClF_2$ | 84 |
| 3FK | 1,1,1-trichlorotrifluoroacetone | $CCl_3 \cdot CO \cdot CF_3$ | ~84 |
| 2FK | Sym-tetrachlorodifluoroacetone | $CCl_2F \cdot CO \cdot CCl_2F$ | 124 |
| 2FK | Asym-tetrachlorodifluoroacetone | $CCl_3 \cdot CO \cdot CClF_2$ | 120 |
| 1FK | Pentachloromonofluoroacetone | $CCl_3 \cdot CO \cdot CCl_2F$ | ~164 |

The subjects FK's may be prepared, for example, by the reaction of hexachloroacetone with HF in the presence of catalysts, such as chromium oxides or antimony halides. Such a procedure is described more in detail, for example, in U.S.P. 3,257,457, to Louis G. Anello and Cyril Woolf, wherein a catalyst consisting of dichromium trioxide is employed.

Conversion of hexachloroacetone to hexafluoroacetone is inevitably incomplete in one-pass operations. Consequently, the crude FK product mixture normally comprises a mixture of FK's having anywhere from 1–6 fluorine atoms, together with considerable amounts of halogen acids, i.e. unreacted HF and by-product HCl, and minor amounts of organic by-products, such as phosgene and halocarbons, e.g. 1,1,2-trichlorotrifluoroethane and 1,2-dichlorotetrafluoroethane.

In the prior art, it is known that non-halogenated ketones and chlorinated ketones may be readily purified by distillation to remove organic impurities and by neutralization with an alkali to remove inorganic impurities such as halogen acds.

Purification of the subject FK's, however, has presented problems and considerations not applicable to the purification of non-halogenated ketones or chlorinated ketones.

Although the various FK's have widely separated boiling points and may be readily separated, one from another, by distillation; some of the organic impurities normally found in the crude FK mixtures have boiling points which are too close to the boiling points of some of the FK's to permit ready separation by distillation.

Unlike non-halogenated ketones and chlorinated ketones, some of the subject SK's are known to form complexes and azeotropic systems with halogen acids (hereafter designated as HY acids or simply as HY).

Some of the complexes which are believed to be formed between the HY acids and the subject FK's include the following:

(1) Hexafluoro - 2 - chloroisopropanol, decomposition point 19° C., M.P. −47° C., from 6FK and HCl.

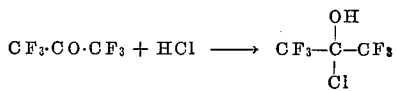

(2) Heptafluoroisopropanol, decomposition point 14°–16° C., M.P. −56° C., from 6FK and HF.

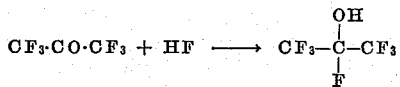

(3) 1 - chlorohexafluoroisopropanol, decomposition point 32°–33° C., M.P. −82° C., from 5FK and HF.

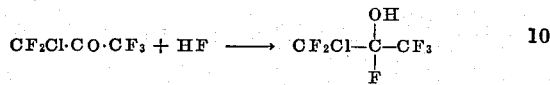

(4) 2 - (1 - chlorohexafluoroisopropoxy) - 1 - chloropentafluoroisopropanol, decompsition point −1° C., from 5FK and HF.

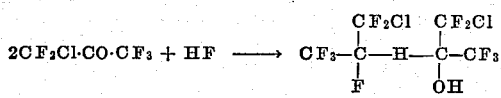

Such FK complexes thus formed are in equilibrium with the HY and with the FK's, so that reaction mixtures obtained from the fluorination of hexachloroacetone will often contain mixtures of several FK's, their HY complexes and free HY, the proportions of each varying considerably with the temperature. At low temperatures the equilibrium is such that the complexes form the major part of the mixture. At higher temperatures, the equilibrium changes and predominant amounts of FK's and HY may be present. However, attempts to completely decompose the complexes by increasing the temperature have proven impractical.

Effective removal of complexed HY from crude FK reaction mixtures depends upon the ability to rupture the complexes and free the HY so that it may be released from the crude FK reaction mixture.

A number of chemical agents have been employed to effect rupture of the FK·HY complexes in order to release trapped HY. It is apparent that the selected agent must not only operate effectively to release essentially all of the trapped HY; but, at the same time, it must not attack the FK and result in loss of significant quantities of the valuable FK product.

One chemical agent in common use for this purpose is NaF. Extensive experimentation by the present inventors with NaF has demonstrated that this is not a practical way to remove HY, particularly HF. It was found that use of NaF leads to chemi-absorption of HF at some temperatures and desorption at other temperatures making temperature and process controls difficult. The end result is incomplete removal of HY.

The prior art points away from the applicability of alkali neutralization used in the non-halogenated ketone or chlorinated ketone art, to the purified of FK's. This is because alkalis are known to react with the FK's and would therefore be expected to result in excessive losses of the FK products. For example, a caveat against use of alkalis to remove acids from FK mixtures is given in British Pat. 976,316 (p. 4, col. 1, lines 4–24). U.S. Pat. 2,827,485 discloses that the FK's react with alkalis such as alkali metal hydroxides, e.g., NaOH, to effect scission and decomposition of the FK molecule.

There is disclosed in copending application of William J. Cunningham and Cyril Woolf, Ser. No. 580,860, mentioned supra, means for breaking FK·HY complexes and freeing crude FK masses from HY and other impurities by forming hydrates of the FK's contained in the crude FK masses and desorbing volatilizable constituents from the hydrates and reconverting the purified hydrates to the corresponding FK's. Such procedure, referred to hereafter as "the hydrate procedure," represents a useful and affective means for effecting purification of the type indicated.

It has now been found, however, that although significant purification of the crude FK's can be effected by the hydrate procedure; very high specification products are obtainable only by proceeding through the monohydrates or as near thereto as possible. Current commercial standards for FK products call for no more than 100 parts per million of HCl and no more than 500 parts per million of HF. Preparation and use of the monohydrates, however, particularly in continuous operations, entails some process disadvantages such as low reaction and absorption rates.

SUMMARY OF THE INVENTION

It is an object of this invention to provide an improvement on the hydrate procedure for purifying crude FK mixtures, particularly from HY impurities.

It is another object of the invention to provide a means for effectively breaking FK·HY complexes to free entrained HY impurities from crude FK masses, without proceeding through FK hydrates.

It is a particular object of the invention to provide a continuous type method for the purification of crude FK's, such as produced by the catalyzed reaction of hexachloroacetone with HF, to anhydrous, high specification grades of FK products or FK product mixtures.

A specific object of the invention is to provide a means for purifying 4FK contained in a crude FK mass.

Another specific object of the invention is to provide a means for purifying 5FK contained in a crude FK mass.

Still another specific object of the invention is to provide a means for purifying 6FK contained in a crude FK mass.

It is another specific object of the invention to provide an improved method for purifying crude FK masses to 10 parts per million or less HY.

Yet another object of the invention is to provide a method for purifying crude FK masses to a specification grade of 10 p.p.m. or less of halogen acids while, at the same time, achieving 98% or higher recovery of the FK product.

Other objects and advantages of the invention will become apparent from the following description.

We have found that the objects of the invention may be accomplished by reacting HY, which is tied up as a complex or otherwise associated in crude FK masses, with a highly specific and critical class of alkalis. Such alkalis react with the HY to form insoluble salts and volatile by-products which may then be readily separated from the system.

The critical class of alkalis which come within the scope of the invention are alkali metal or alkaline earth metal salts of polybasic acids in which salts the last hydrogen ion in the polybasic acid which has been replaced by the metal ion has an ionization constant of between $1.0 \times 10^{-5}$ and $1.0 \times 10^{-11}$, inclusive. Salts based upon polybasic acids in which the last hydrogen ion of the acid which has been replaced by a metal ion has an ionization constant less than $1.0 \times 10^{-11}$, are not suitable for use in the purification of crude FK mixtures in accordance with the invention because such materials react with the FK's to cause decomposition of the same and significant loss of product. Salts based upon polybasic acids in which the last hydrogen ion of the acid which has been replaced by a metal ion has an ionization constant greater than $1.0 \times 10^{-5}$, are not suitable for use in the purification of crude FK mixtures in accordance with the invention because such materials do not effect a sufficient degree of rupture of FK·HY complexes and achieve a sufficient degree of neutralization of the HY present in the mixture.

Suitable salts falling within the scope of the invention may be readily ascertained by reference to tables of ionization constants which may be found in standard chemical texts. For example, see Lange, Handbook of Chemistry, McGraw-Hill, 10th ed. (1961) pp. 1198–1202. Illustrative salts within the scope of the invention include the following. The pertinent ionization constant is shown in brackets: $Na_2CO_3$ ($5.6 \times 10^{-11}$), $NaHCO_3$ ($4.31 \times 10^{-7}$), $Na_2HPO_4$ ($6.2 \times 10^{-8}$)

$NaBO_2(5.7 \times 10^{-10})$, $Na_2B_4O_7(5.7 \times 10^{-10})$, $$Na_4P_2O_7(4.06 \times 10^{-10})$$

and $Na_2SO_3(6.24 \times 10^{-8})$. The preferred alkali is $Na_2CO_3$. Illustrative salts not within the scope of the invention include the following: $NaH_2PO_4(7.5 \times 10^{-3})$, $$Na_3PO_4(4.8 \times 10^{-13})$$

$NaH_3P_2O_7(1.4 \times 10^{-1})$ and $Na_2H_2P_2O_7(1.1 \times 10^{-2})$.

In view of the prior art reports on the reactivity of the FK's toward alkalis it was surprising to find that a specific class of alkalis would effectively neutralize HY from crude FK mixtures containing the same without, at the same time, attacking the FK's to cause loss of valuable product. It was found that the critically defined alkalis, in accordance with the invention process, effect a high degree of neutralization, while at the same time, make it possible to achieve 98% and better recovery of FK.

Neutralization of HY in FK mixtures in accordance with the invention may be carried out by reacting such a mixture with one or more of the subject workable alkalis, hereinafter referred to as "the subject neutralizing agents" or "a subject neutralizing agent." The subject neutralizing agents rupture FK·HY complexes present and react with HY, which is liberated, to form salts which can be removed from the system. The neutralization agent may be contacted directly with a crude FK mixture, a hydrated form of an FK mixture or with a partially purified FK mixture.

In the preferred embodiment, to be discussed more in detail hereafter, a crude FK mass is hydrated with water and heated to remove gross quantities of organic and inorganic impurities. The partially purified mixture, if containing essentially 4FK, is then directly neutralized as described above, or if containing essentially 5FK or 6FK, is first dehydrated and then neutralized as described above to remove residual amounts of halogen acids to high specifications.

In another advantageous embodiment, useful when a hydration step is employed, a pretreatment step for HF containing crude FK masses is employed which comprises converting substantial amounts of the HF present in the crude FK masses to HCl. Neutralization is then carried out by any of the methods described above. This pretreatment step is based upon the observation that HCl is more efficiently removed by hydration than HF. Having a greater proportion of HY impurities present as HCl, as opposed to HF, enables the relative selective purification action of the hydration step, if employed, to be utilized to maximum advantage.

The present invention provides a purification technique capable of achieving higher specification FK than is possible with the hydrate procedure, while, at the same time, not suffering from the disadvantages possessed by the hydrate procedure, such as those of requiring long reaction and absorption periods in those embodiments necessary to achieve highest specification standards.

DETAILED DESCRIPTION OF THE INVENTION

The combination

The invention in its broadest aspects involves use of a critically defined class of neutralizing agents to purify HY containing FK mixtures. A major object of the invention is accomplished by carrying out the direct neutralization of HY impurities present in FK masses with such neutralizing agents.

As mentioned previously, however, the neutralization step may be combined with other steps in order to achieve special results or to achieve flexibility in operation. For example, a hydration step may be included before neutralization is effected. The hydration step may be controlled to produce stable or unstable hydrates or mere water solutions. The hydration step may optionally include a desorption step to improve results. The neutralization step can be carried out on the hydrated materials produced by the hydration step or on reconstituted FK obtained by dehydrating the hydrated material. If a hydration step is employed, anhydrous purified FK may be reconstituted by a dehydration step. Dehydration may be effected with desiccating agents or by taking advantage of the disassociation reaction of certain unstable hydrates to form the corresponding free anhydrous FK and the corresponding stable hydrate. A dehydration or drying step may also be employed after the neutralization step, whether or not a hydration step is employed, to remove water introduced during the neutralization step.

Embodiments in which hydrates are directly neutralized are particularly suited for 4FK purification. This is because 4FK forms an exceedingly stable hydrate, viz. $4FK \cdot 2\frac{1}{2}H_2O$. $4FK \cdot 2\frac{1}{2}H_2O$ is more stable than the stable hydrates of 5FK and 6FK, viz. $5FK \cdot 3H_2O$ and $6FK \cdot 3H_2O$, and can be readily vaporized and passed through a solid neutralizing agent in gaseous form without undergoing any significant degree of decomposition. $5FK \cdot 3H_2O$ and $6FK \cdot 3H_2O$, however, although reasonably stable in the basic environments utilized herein, are somewhat less stable therein than $4FK \cdot 2\frac{1}{2}H_2O$, particularly at elevated temperatures, and will undergo a higher degree of decomposition.

Although $5FK \cdot 3H_2O$ and $6FK \cdot 3H_2O$ can be directly neutralized, when such hydrates are formed, it is preferred to dehydrate them to the corresponding FK before treatment with the neutralizing agent.

As already mentioned, if a hydration step is employed, it is advantageous to include a pretreatment step for converting HF in the crude FK mass to HCl. If a hydration step is not included in the purification scheme, there is no advantage in including such a pretreatment step.

A particular purification scheme within the scope of the invention may be set up to operate in continuous or batch-type fashion.

THE INDIVIDUAL PROCEDURAL STEPS OF THE INVENTION

Part A.—The neutralization step

The neutralization step may be carried out in liquid phase or vapor phase. It is preferred to employ the FK mixture in vapor phase. This is accomplished by selecting an operating temperature above the boiling point of the highest boiling FK in the mixture. Temperatures significantly above about 160° C. should be avoided to avoid losses of FK by decomposition. For best results, moderate temperatures should be maintained, for example between about 50° C. and 130° C. The preferred operating temperature range is about 110° C.–130° C. As noted heretofore, neutralization in accordance with the invention may be effected on anhydrous FK or on hydrated forms of FK.

Operating pressures for the neutralization step are not critical and may be atmospheric, sub-atmospheric or super-atmospheric. Sub-atmospheric pressures in vapor-phase operation would permit more efficient operation at lower temperatures and thus reduce even small losses of FK by decomposition. There is no advantage in employing super-atmospheric pressures in vapor phase. Pressure is not a factor in liquid phase operation. Atmospheric pressure for both liquid phase and vapor phase operation is preferred.

The HY containing FK mixture may be conveniently neutralized by passing the mixture, in gaseous form, through a bed of a subject neutralizing agent in solid form. Less desirably, the neutralizing agent may be utilized in liquid form, such as in aqueous solution or in solution with an inert solvent.

The amount of neutralizing agent which should be employed is not absolutely critical. The stoichiometry of the neutralization reaction and the type reaction employed will generally dictate the proportion of neutralizing agent to be used. For example, with $Na_2CO_3$, the preferred neutralizing agent, one mol is theoretically required to neutralize two mols of HY. Large excesses of neutralizing agent will not adversely affect the reaction and there is therefore no upper limitation on the amount of neutralizing agent that can be used. It has been found that with $Na_2CO_3$, the preferred quantity to use lies between about 1–4 mols per mol of HY present. Preferred concentrations of other neutralizing agents within the scope of the invention may be ascertained by routine experimentation.

The neutralization step may be carried out continuously or batch-wise.

Part B.—The hydration step

If a hydration step is employed, it may be conducted substantially as described in copending application of William J. Cunningham and Cyril Woolf, Ser. No. 580,860, mentioned supra. The subject matter of Ser. No. 580,860 is hereby incorporated by reference. Use of a hydration step serves to remove gross quantities of HY impurities as well as organic impurities, thereby reducing the consumption of neutralizing agent for the attainment of very high purity FK.

Essentially, the hydration step comprises contacting the crude FK mixture with liquid-phase water in an amount equivalent to provide a total of at least one mol of water per mol of FK, while maintaining temperature such that any free water present is in liquid phase, to evolve off quantities of HY and form a more purified reaction mass containing recoverable FK hydrate. Water may be added in the form of an FK hydrate.

As discussed in copending application Ser. No. 580,860, the addition of water to the FK/HY mixture causes rupture of FK/HY complexes and frees HY, otherwise entrained, which may then be evolved off as a gas. Rupture of FK/HY complexes takes place in favor of FK hydrates which are formed or when reaction masses containing recoverable perhaloacetone hydrates are formed.

Since impurities are evolved off upon formation of the subject FK·hydrates or upon formation of reaction masses from which such hydrates are recoverable; the reaction mass obtained by the reaction of subject FK's with $H_2O$ will be referred to as "the purified reaction mass."

The term "recoverable FK hydrate" refers to a reaction mass which is formed between the subject FK's and $H_2O$ which contains an amount of $H_2O$ which is in excess of that required to form an identifiable hydrate and from which mass an identifiable hydrate is recoverable.

For the present purposes, the term "hydrate" will be understood as referring generically to either "identifiable hydrates" or "recoverable hydrates."

Some of the useful identifiable hydrates which may be formed by the above procedure are shown in Table II.

TABLE II

| Hydrate | Melting point, °C. | Boiling point, °C. |
|---|---|---|
| $6FK \cdot 3H_2O$ | | 106 |
| $6FK \cdot H_2O$ | 46 | Disassociates >46. |
| $5FK \cdot 3H_2O$ | | 105 |
| $5FK \cdot H_2O$ | 26.5 | Disassociates >26.5. |
| $4FK \cdot 2\frac{1}{2}H_2O$ | −8 | 106 |

The above reported hydrates of 5FK and 6FK, including certain recoverable hydrates may be represented generically as follows: $C_3OCl_{6-x}F_x \cdot nH_2O$, wherein $x$ is 5 or 6 and $n$ has a value from 1 to 3.

Some of these hydrates, such as $5FK \cdot H_2O$ and $$6FK \cdot H_2O$$

are true compounds whereas others such as $5FK \cdot 3H_2O$ and $6FK \cdot 3H_2O$ are actually constant boiling mixtures of the components in the indicated proportions.

$5FK \cdot H_2O$ and $6FK \cdot H_2O$ for example, form solutions or slurries with less than 2 additional mols of $H_2O$. Such solutions or slurries will be characterized herein as a hydrate, i.e. as $FK \cdot xH_2O$ wherein $x$ represents the proportionate number of mols of water present.

$5FK \cdot 3H_2O$ and $6FK \cdot 3H_2O$ form liquid mixtures with excess $H_2O$. The trihydrates are not identifiable in such mixtures but are formed and are recovered by distillation of the mixtures.

Some of the above noted hydrates, notably $5FK \cdot 3H_2O$ and $6FK \cdot 3H_2O$ are stable, constant boiling mixtures. Others, particularly $5FK \cdot H_2O$ and $6FK \cdot H_2O$, are unstable compounds and disassociate upon heating to form the corresponding free FK and the stable hydrate of the corresponding FK. The latter property of such unstable hydrates may be taken advantage of to regenerate and recover free anhydrous purified FK without the need to resort to a dehydrating agent. The stable hydrate which is produced in the disassociation reaction may be recycled to contact crude FK feed as water source.

Formation of the hydrates can be carried out under a wide range of temperatures which may vary between the melting point and boiling point of the particular hydrate involved. For the present purposes, it is preferred that temperatures in the range of about 40° C.–70° C. be employed. In this connection it will be noted that if the nature of the feed and the amount of water provided is such as to cause formation of $5FK \cdot H_2O$ or $6FK \cdot H_2O$, then the preferred temperature range will include those temperatures which will cause immediate disassociation of these materials. This is not a deleterious result, however, as the separation of HY will still take place and a purer form of anhydrous FK will be generated and may be recovered.

The pressure which should be employed during the hydration step is not critical. Super-atmospheric pressures, however, would make it more difficult to evolve off freed HY gas and other volatilizable constituents and accordingly is not preferred. Atmospheric pressure is the most practical and thus is preferred.

It has been found that the amount of water which is supplied to the system is important. If unstable hydrates are intended to be employed, such as $5FK \cdot H_2O$ and $6FK \cdot H_2O$, the mol ratio of water contacted with the FK should be less than about 2.8:1 in order to effectuate formation of a substantial amount of recoverable monohydrates. A molar ratio of about 2:1 (to form $FK \cdot 2H_2O$) has been found to be quite suitable. A precise 1:1 molar ratio is not employed since, for reasons described supra, this results in unduly low reaction and absorption rates.

If the stable hydrate route is chosen, such as via $5FK \cdot 3H_2O$ and $6FK \cdot 3H_2O$, the amount of water supplied to the system should be at least about 2.8 mols of water per mol of FK in order to effectuate formation of substantial amounts of the trihydrates. If substantial amounts of unstable hydrates are formed in a system which is designed for stable hydrates, as would be the case if less than about 2.8 mols of water per mol of FK are employed, large amounts of FK will be lost due to disassociation of the monohydrate when formed and heated past its disassociation point.

It has further been found, when working with $$5FK \cdot 3H_2O$$

and $6FK \cdot 3H_2O$, if large excesses of water are provided, that the residual HY content of the resulting hydrate or solution containing recoverable hydrate will be higher. This is because azeotropic mixtures will be formed between the HY present and $H_2O$ which is in excess of three mols per mol of FK in the mixture. Such $HY/H_2O$ azeotropes have boiling points of about 111° C. which are higher than the boiling points of either $5FK \cdot 3H_2O$ or $6FK \cdot 3H_2O$ (105° C.–106° C.). The HY will accordingly remain thus associated in the system. For this reason the provision of large excesses of $H_2O$ should be avoided. Another reason to avoid the presence of large excesses of $H_2O$ is that large excesses of water will require large quantities of dehydrating agent for reconstitution of the FK product. Hence, no more than about 5 mols of water per mol of FK should be employed. It has been found that for superior results between about 2.8–3.5 mols of water per mol of FK should be present. The preferred molar ratio of water to FK in this step is between about 3.0–3.2:1.

When working with 4FK·2+½H₂O, the same considerations regarding excess water apply except that a preferred ratio of water to FK is about 2.3–3.0:1 with the optimum molar ratio of water to FK being about 2.5–2.7:1.

Part C.—The desorption step

If a hydration step is employed, a desorption step is optional but preferred. Greater separation of HY and organic impurities than is possible by merely carrying out the above-described hydration step of part B may be achieved by heating the hydrates (or recoverable hydrates) thus produced to volatilize therefrom volatile constituents which boil below about 105° C. at atmospheric pressure.

When stable hydrates such as 5FK·3H₂O and

6FK·3H₂O are employed the desorption is carried out with no change in composition of the hydrate. When unstable hydrates, such as 5FK·H₂O and 6FK·H₂O are subjected to the desorption step, the unstable hydrates disassociate above their disassociation temperature to form the corresponding trihydrates and corresponding anhydrous FK's.

In order to achieve any significant desorption effect, the temperature of the hydrate should be raised to at least about 70° C. but should not of course be permitted to exceed the boiling point of the hydrate. Desorption would be facilitated by operating under sub-atmospheric conditions, however, atmospheric pressure is quite satisfactory and more practical and is therefore preferred.

Part D.—The dehydration step

If a hydration step is employed, with or without a desorption step, a dehydration step will be required in order to obtain anhydrous FK product, if desired. For some purposes, however, the HY freed FK hydrate may be used as such without reconstituting the FK.

A dehydration step may also be used, in a preferred embodiment of the invention, as described heretofore, for converting 5FK·3H₂O and 6FK·3H₂O to the corresponding FK's prior to neutralization. In addition, a dehydration step may be used as a final drying step on purified FKs in order to remove water added to the system as a result of the neutralization step.

In addition to dehydration in the sense that water is removed by the disassociation of certain unstable monohydrates discussed previously, dehydration may be effected directly with a suitable desiccating agent, such as conc. H₂SO₄, P₂O₅ and SO₃. Any desiccating agent capable of removing all the H₂O associated with the FK including any chemically combined H₂O may be employed. The preferred desiccating agent is conc. H₂SO₄ (about 80–100%).

The dehydration step is preferably but not necessarily carried out at temperatures above the boiling point of the FK mixture involved and should be carried out below the point at which undue decomposition of the FK mixture will take place (about 160° C.) or below the point at which the desiccating agent will vaporize. (H₂SO₄ undergoes some degree of vaporization at about 150° C.) The preferred operating temperature range for dehydration is between about 60–80° C.

Pressures which should be maintained during the dehydration step are preferably atmospheric although super-atmospheric pressures and sub-atmospheric pressures could be used. Sub-atmospheric pressure is more or less impractical, however, since it would increase the vapor pressure of the H₂SO₄. Likewise, exceedingly high pressures would be impractical since this would occasion the use of higher operating temperatures thereby complicating decomposition and corrosion factors. Generally, pressures in the range of about 0–100 p.s.i.g. could be employed satisfactorily. Atmospheric pressure is the most practical, however, and for this reason is preferred.

Part E.—The HF pretreatment step

The pretreatment step for converting HF in the crude FK mixture to HCl, discussed supra, may be carried out by contacting the HF containing FK mixture with any chemical agent capable of accomplishing this result. The chemical agent chosen should, of course, not react with the FK present.

It has been found that metal chlorides, particularly alkaline earth metal chlorides and preferably CaCl₂ are effective for this purpose. The metal chlorides should be used in anhydrous form.

Operating temperatures for the pretreatment step are not absolutely critical. A good working range is from about 100–260° C., with preferred temperatures being in the lower portion of that range.

Pressures are not critical but atmospheric pressure is preferred.

BRIEF DESCRIPTION OF THE DRAWINGS

FIG. 3 is a schematic diagram illustrating still another preferred embodiment of the invention in which a crude 6FK mixture is purified by a procedure which includes as essential steps: hydrating 6FK to 6FK·2H₂O, neutralizing the 6FK·2H₂O, disassociating the 6FK·2H₂O (6FK·H₂O) to 6FK and 6FK·3H₂O and drying the 6FK.

DESCRIPTION OF THE PREFERRED EMBODIMENTS AND EXAMPLES

The following examples illustrate preferred embodiments of the invention in that they describe preferred purification schemes. It is to be understood that such examples are not to be taken as limitative of the scope of the invention and that modifications of the schemes, including rearrangement of steps and components, may be devised by those skilled in the art without departing from the scope and spirit of the invention. The purification schemes delineated herein may be followed by fractional distillation for the separation of homologous RK's, for the separation of CO₂ which is produced in the neutralization step if Na₂CO₃ is employed or for the separation of other by-products of the neutralization step.

EXAMPLE 1

Figure 1:
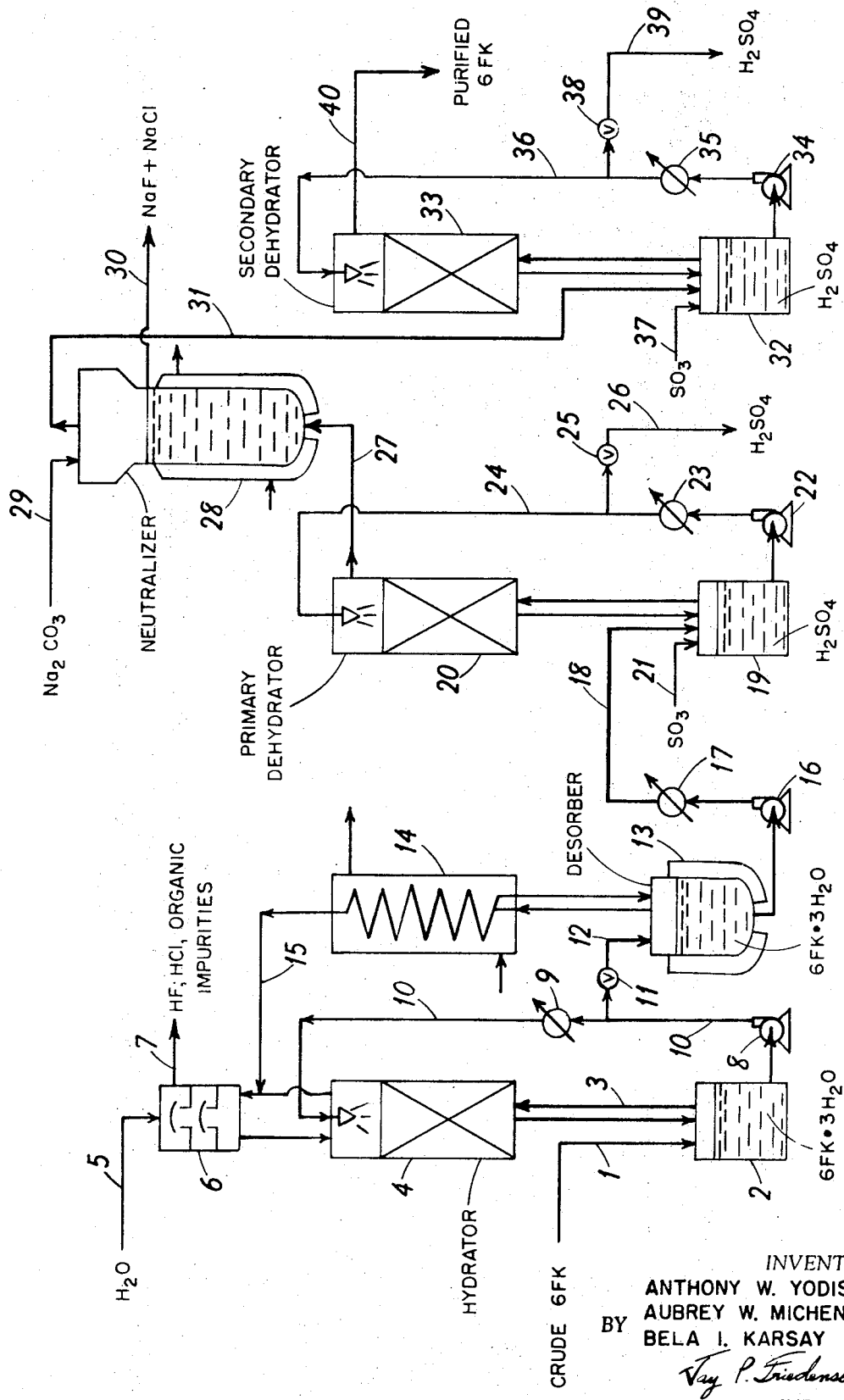
FIG. 1 is a schematic diagram illustrating a preferred embodiment of the invention in which a crude 6FK mixture is purified by a procedure which includes as essential steps: hydrating 6FK to 6FK·3H₂O, desorbing the 6FK·3H₂O, dehydrating the desorbed 6FK·3H₂O, neutralizing the dehydrated 6FK·3H₂O (6FK) and drying the neutralized 6FK.

Referring to FIG. 1 of the drawings, 1,000 g. of crude 6FK, produced by the Cr₂O₃ catalyzed reaction of HF with hexachloroacetone and having the following make-up:

| | |
|---|---|
| 6FK | 470 g. (47 wt. %) |
| HF | 100 g. (10 wt. %) |
| HCl | 400 g. (40 wt. %) |
| Organic impurities | 30 g. (4.0 wt. %) | are continuously fed through pipe 1 into a body of 6FK·3H₂O contained in circulating pot 2. At start up of the reaction, circulating pot 2 contains just water which, as the reaction proceeds, becomes essentially 6FK·3H₂O. The crude 6FK feed is fed into the gas space of pot 2 and proceeds upwardly through pipe 3 into hydrator 4 wherein it is reacted, at temperatures between 40–70° C., with 153 g. of water which is introduced through pipe 5 and bubble-cap column 6 into hydrator 4. The 6FK which is introduced into hydrator 4 is converted therein to 6FK·3H$_2$O. Large quantities of halogen acids and organic impurities being only moderately soluble in 6FK·3H$_2$O at the temperatures maintained in the hydrator pass through the 6FK·3H$_2$O and leave the apparatus through bubble-cap column 6 and exit pipe 7. A large portion of the 6FK·3H$_2$O which is formed and collects in pot 2 is circulated by pump 8 from the pot through heat exchanger 9 and pipe 10 into the top of hydrator 4. The remainder of the partially purified 6FK·3H$_2$O which is produced and collected in pot 2 is continuously withdrawn from the system through valve 11 and is transferred via pipe 12 to desorber 13. The partially purified 6FK·3H$_2$O entering desorber 13 contains the following impurities:

| | Percent by weight |
|---|---|
| HF | 15–20 |
| HCl | 4–6 |
| Organic impurities | 0.1–0.2 |

In desorber 13, the partially purified 6FK·3H$_2$O is heated to just below its boiling point (106° C.) to effect further removal of impurities. The gases which are desorbed at this point comprise essentially HF, HCl and small amounts of organic materials and are passed through reflux condenser 14 and pipe 15 to combine the same with the off-gases from hydrator 4. The purpose of the reflux condenser is to reclaim 6FK·3H$_2$O vapors entrained by the halogen acid and organic acid impurities leaving desorber 13. The combined gas stream passes upwardly through bubble-cap column 6 to ensure a perfect absorption of 6FK·3H$_2$O vapors by the water which is fed through pipe 5 to the hydrator. Upon passing through bubble-cap column 6, the combined gas stream containing the separated HF, HCl and organic impurities then leaves the system through exit pipe 7. The weights of the components of the combined gas stream leaving the system through exit pipe 7 and the weight percent removal of the total amount of these components originally present are shown below:

| | Weight removed, g. | Weight percent removal |
|---|---|---|
| HF | 75 | 75 |
| HCl | 390 | 97.5 |
| Organic impurities | 29 | 97 |

658 g. of desorbed 6FK·3H$_2$O, consisting of:

| | G. |
|---|---|
| 6FK | 470 |
| H$_2$O | 153 |
| HF | 25 |
| HCl | 10 | are withdrawn from desorber 13, and transferred by means of pump 16 through heat exchanger 17 through pipe 18 into circulating pot 19 for primary dehydrator 20.

In primary dehydrator 20, the desorbed 6FK·3H$_2$O is reacted with 98% H$_2$SO$_4$ at temperatures between 60–80° C. to effect dehydration. 680 g. of make-up SO$_3$ are added through feed-line 21 to the H$_2$SO$_4$ in order to maintain a constant concentration of H$_2$SO$_4$. The H$_2$SO$_4$ is circulated from circulating pot 19 by means of pump 22 through heat exchanger 23 and pipe 24 into the top of dehydrator 20. 844 g. of excess acid consisting of 833 g. of H$_2$SO$_4$, 8 g. of HF and 3 g. of HCl are withdrawn from the system through valve 25 and exit pipe 26.

488 g. of anhydrous 6FK, having the following composition:

| | G. |
|---|---|
| 6FK | 464 |
| HF | 17 |
| HCl | 7 | are recovered from dehydrator 20 and are passed through pipe 27 into the bottom of neutralizer 28. There the anhydrous 6FK is transferred upwardly through a bed of soda ash (Na$_2$CO$_3$) at a temperature between 110–130° C. to remove residual amounts of halogen acids. 55 g. of soda ash are consumed by the halogen acids with 47 g. of salts having the following composition:

| | G. |
|---|---|
| NaF | 36 |
| NaCl | 11 | being formed. Make-up soda ash is introduced through feed line 29 into neutralizer 28 while reacted soda ash containing high percentages of NaF and NaCl is withdrawn through outlet pipe 30.

494 g. of scrubbed gas are recovered from neutralizer 28. No detectable amounts of halogen acids are found in the scrubbed gas. Analysis of the 494 g. of scrubbed gas showed the following composition:

| | G. |
|---|---|
| 6FK | 462 |
| CO$_2$ | 23 |
| H$_2$O | 9 |

In order to remove the H$_2$O introduced during the scrubbing step, the scrubbed gas is subjected to a second dehydrating or drying step. The scrubbed gas from neutralizer 28 is passed through pipe 31 into circulating pot 32 for secondary dehydrator 33. In secondary dehydrator 33 the gas mixture is scrubbed with 98% H$_2$SO$_4$ at a temperature between 60–80° C. to remove the 9 g. of H$_2$O therefrom. The sulfuric acid used in secondary dehydrator 33 is circulated from circulating pot 32 by means of pump 34 through heat exchanger 35 and pipe 36 into secondary dehydrator 33. 40 g. of make-up SO$_3$ are required to keep the H$_2$SO$_4$ concentration constant. The SO$_3$ is added as make-up to circulating pot 32 through feed line 37. 49 g. of excess H$_2$SO$_4$ are withdrawn from the system through valve 38 and exit pipe 39. A total of 483 g. dried gas having the following composition:

| | G. |
|---|---|
| 6FK | 460 |
| CO$_2$ | 23 | exists secondary dehydrator 33 through exit pipe 40. 6FK recovery is 98% by weight.

Example 2

Figure 2:
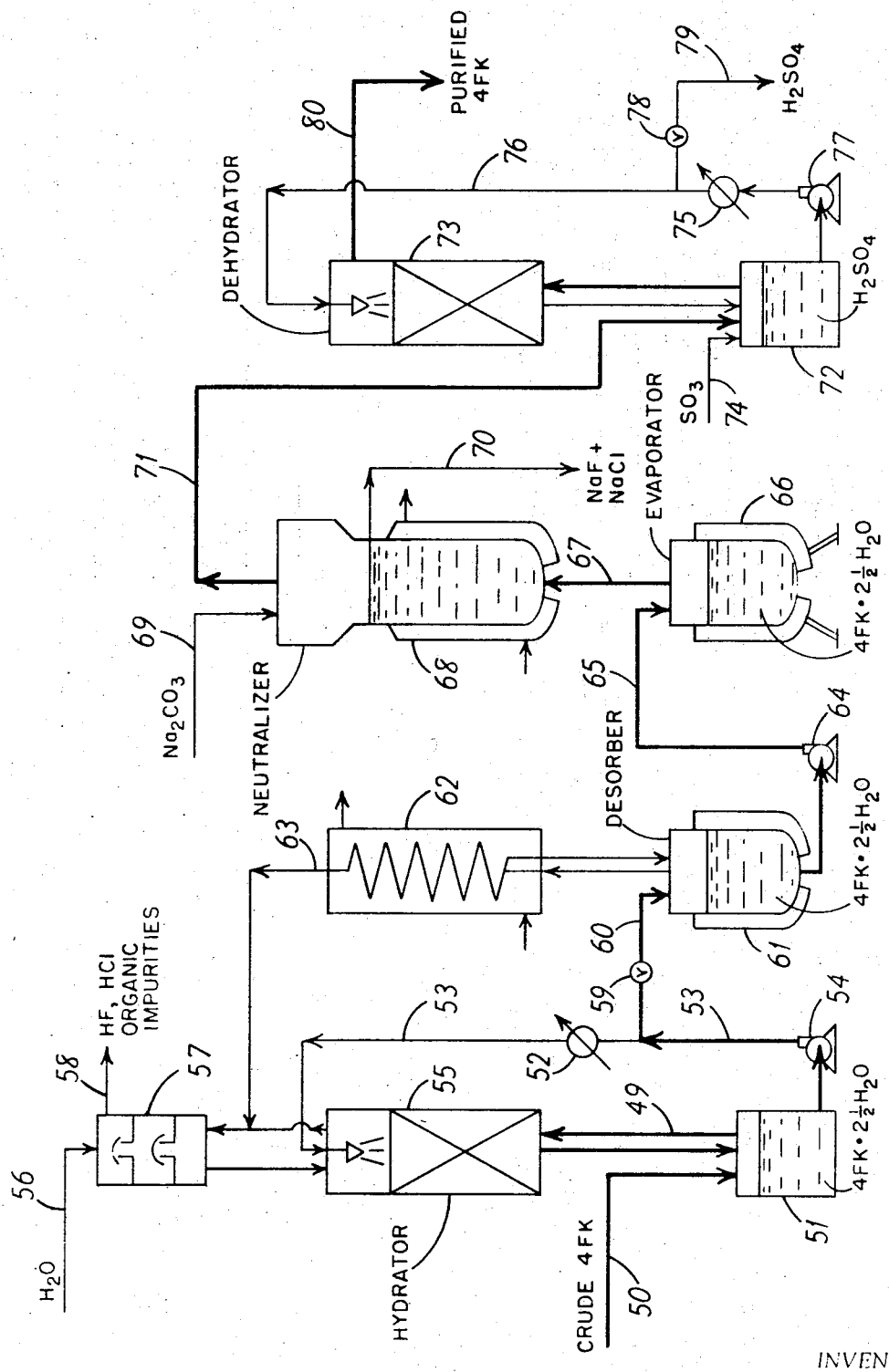
FIG. 2 is a schematic diagram illustrating another preferred embodiment of the invention in which a crude 4FK mixture is purified by a procedure which includes as essential steps: hydrating 4FK to 4FK·2½H₂O, desorbing the 4FK·2½H₂O, neutralizing the desorbed 4FK·2½H₂O and dehydrating the neutralized 4FK·2½H₂O.

Referring to FIG. 2 of the drawings, 1,000 g. of crude 4FK obtained from an antimony halide catalyzed reaction of hexachloroacetone and HF and having the following composition:

| | |
|---|---|
| 4FK | 470 g. (47 wt. %) |
| HF | 100 g. (10 wt. %) |
| HCl | 400 g. (40 wt. %) |
| Organic impurities | 30 g. (3.0 wt. %) | are continuously fed through pipe 50 into a body of 4FK·2½H$_2$O contained in circulating pot 51. At start up of the reaction, circulating pot 51 contains just water which, as the reaction proceeds, becomes essentially 4FK·2½H$_2$O. The crude 4FK feed is fed into the gas space of pot 51 and proceeds upwardly through pipe 49 into hydrator 55 wherein it is reacted, at temperatures between about 50–70° C., with 106 g. of water which are introduced through pipe 56 and bubble-cap column 57 into hydrator 55. The 4FK which is introduced into hydrator 55 is converted therein to 4FK·2½H$_2$O. Large quantities of halogen acids and organic impurities being only moderately soluble in 4FK·2½H$_2$O at the temperatures maintained in the dehydrator pass through the 4FK·2½H$_2$O and leave the apparatus through bubble-cap column 57 and exit pipe 58. A large portion of the 4FK·2½H$_2$O is circulated by pump 54 through pipe 53 and heat exchanger 52 into the top of hydrator 55. The remainder of the partially purified 4FK·2½H$_2$O is continuously withdrawn from pipe 53 through valve 59 and pipe 60 and is fed to desorber 61. Upon entering desorber 61, the partially purified 4FK·2½H₂O contains the following impurities:

| | Percent by weight |
|---|---|
| HF | 15–20 |
| HCl | 4–6 |
| Organic impurities | 0.1–0.2 |

In desorber 61, the partially purified 4FK·2½H₂O is heated to just below its boiling point (106° C.) to effect further removal of impurities. The gases which are desorbed at this point comprise essentially HF, HCl and small amounts of organic materials, and are passed through reflux condenser 62 and pipe 63 to combine with the off-gases from hydrator 55. The purpose of the reflux condenser is to reclaim 4FK·2½H₂O vapors entrained by the halogen acid and organic acid impurities leaving desorber 61. The combined gas stream passes upwardly through bubble-cap column 57 to ensure a perfect absorption of 4FK vapors by the water which is fed through pipe 56 to the hydrator. Upon passing through bubble-cap column 57, the combined gas stream containing the separated HF, HCl and organic impurities then leaves the system through exit pipe 58. The weights of the components of the combined gas stream leaving the system through exit pipe 58 and the weight percent removal of the total amount of these components originally present are shown below:

| | Weight removed, g. | Weight percent removal |
|---|---|---|
| FF | 87 | 87 |
| HCl | 394 | 98 |
| Organic impurities | 29 | 97 |

595 g. of 4FK·2½H₂O consisting of:

| | |
|---|---|
| 4FK | 470 g. |
| H₂O | 106 g. |
| HF | 13 g. (2.2% by wt.) |
| HCl | 6 g. (1.0% by wt). | are withdrawn from desorber 61 and are transferred by pump 64 through pipe 65 into evaporator 66. There the 4FK·2½H₂O is vaporized and the vapors are piped through pipe 67 into the bottom of neutralizer 68 wherein the vapors continue to pass upwardly through a bed of soda ash (Na₂CO₃) maintained at temperatures between 110–130° C. The soda ash reacts with the residual halogen acids to form salts, CO₂ and H₂O. 43 g. of soda ash are consumed and 37 g. of insoluble salts having the following composition are formed:

| | G. |
|---|---|
| NaF | 27 |
| NaCl | 10 |

Make-up soda ash is added through feed line 69 into neutralizer 68 while reacted soda ash containing high percentages of NaF and NaCl is withdrawn through outlet pipe 70.

601 g. of scrubbed gaseous 4FK·2½H₂O are removed from neutralizer 68 through pipe 71. No detectable amounts of halogen acids are found in the scrubbed gas. Analysis of the scrubbed gas shows the following composition:

| | G. |
|---|---|
| 4FK | 470 |
| H₂O | 113 |
| CO₂ | 18 |

Pipe 71 takes the scrubbed gaseous 4FK·2½H₂O into circulating pot 72 for dehydrator 73. In dehydrator 73, the gaseous 4FK·2½H₂O mixture is reacted with 98% sulfuric acid at temperatures between 60–80° C. to effect dehydration. 502 g. of make-up SO₃ are added through feed-line 74 in order to maintain a constant concentration of H₂SO₄. The H₂SO₄ is circulated by means of pump 77, from circulating pot 72 through heat exchanger 75 and pipe 76 to the top of dehydrator 73. 615 g. of excess acid consisting of H₂SO₄, HF and HCl are withdrawn from the system through valve 78 and exit pipe 79.

474 g. of anhydrous 4FK having the following composition:

| | G. |
|---|---|
| 4FK | 456 |
| CO₂ | 18 | are recovered from dehydrator 73 through outlet pipe 80. Recovery of the 4FK is 97% by weight.

Example 3

Referring to FIG. 3 of the drawings, 6FK, produced by the Cr₂O₃ catalyzed reaction of HF with hexachloroacetone is continuously fed through pipe 90 into the gas space in surge tank 91 and proceeds upwardly through pipe 92 into hydrator 93 wherein it is absorbed by

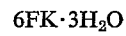

6FK·3H₂O which is fed into the top of hydrator 93 from another point in the system via pipe 105, as will be mentioned hereafter, to form 6FK·2H₂O. At start-up of the reaction, surge tank 91 contains just water which, as the reaction proceeds, becomes essentially 6FK·2H₂O. Temperatures in the hydrator are maintained between about 20–50° C. Large quantities of halogen acids and organic impurities being only moderately soluble in 6FK·2H₂O at the temperatures maintained in the hydrator pass through the 6FK·2H₂O and are removed from the system through exit pipe 95. 6FK·2H₂O is transferred from surge tank 91 through pipe 96 into neutralizer 97, wherein it is reacted with NaHCO₃. The resulting slurry containing insoluble salts is transferred by means of pump 98 and pipe 99 to filter 100 wherein the insoluble salts are separated. The insoluble salts are removed from filter 100 through pipe 118.

The filtrate from filter 100, consisting essentially of partially purified 6FK·2H₂O is fed through pipe 101 into disassociationator 102 wherein it is contacted with a body of boiling 6FK·3H₂O (at 106° C.) to effect disassociation into anhydrous 6FK and 6FK·3H₂O. As has already been explained 6FK·2H₂O is merely 6FK·H₂O in association with one additional mol of water and it is to be understood that 6FK·H₂O undergoes the disassociation reaction which it will do despite the presence of up to two but not including two additional mols of water. 6FK·3H₂O is recycled by means of pump 104 via heat exchanger 103 through pipe 105 to hydrator 94 for use as water source.

The anhydrous 6FK formed is transferred from disassociationator 102 through pipe 107 and reflux condenser 106 into pipe 108 wherein it is introduced into circulating pot 110 of dehydrator 109. In dehydrator 109, vapors of 6FK·3H₂O which may have been entrained by the anhydrous 6FK are removed by contacting the anhydrous 6FK with 98% solfuric acid at a temperature between 60–80° C. H₂SO₄ is circulated from circulating pot 110 into dehydrator 109 through heat exchanger 111 and pipe 112 by means of pump 113. Make-up SO₃ is added through feed line 114 to circulating pot 110 in order to maintain a constant H₂SO₄ concentration. Excess H₂SO₄ is withdrawn from the system through valve 115 and exit pipe 116.

Purified anhydrous 6FK is recovered from dehydator 109 and is removed from the system through exit pipe 117. The 6FK thus recovered has no detectable amounts of halogen acids.

Example 4

This example demonstrates the usefulness of Na₄P₂O₇ for neutralization purposes in accordance with the invention.

A feed gas obtained from a Cr$_2$O$_3$ catalyzed reaction of HF with hexachloroacetone and having the following composition:

6FK—82 (wt. percent)
    5FK—17 (wt. percent)
    HF—7000 p.p.m.
    HCl—3000 p.p.m.

is passed upwardly through a 36″ length bed of Na$_4$P$_2$O$_7$ contained in a 1″ diameter tube. A total of 208 g. of feed gas is passed through the tube over a period of 5.5 hrs. Temperature in the tube is maintained at 100° C. At the end of the run, the scrubbed gas is analyzed. The HF content is reduced from 7000 p.p.m. to 3 p.p.m. The HCl content is reduced from 3000 p.p.m. to 3 p.p.m. There is no evidence of molecular degradation of the 5FK or 6FK.

Example 5

This example demonstrates the unsuitability for neutralization in accordance with this invention of an alkali metal salt of a polybasic acid in which salt the last hydrogen ion of the polybasic acid which has been replaced by the metal ion has an ionization constant which does not fall within the critically defined $1.0 \times 10^{-5}$ to $1.0 \times 10^{-11}$ range in accordance with the invention.

A feed gas of crude 6FK, obtained from a Cr$_2$O$_3$ catalyzed reaction of HF with hexachloroacetone, containing 4.8 weight percent HCl and 0.14 weight percent HF, is passed through a bed of NaH$_2$PO$_4$·H$_2$O ($K_1 = 7.5 \times 10^{-3}$) at ambient temperatures. Analysis of the scrubbed product shows that the HCl content is reduced from 4.8 wt. percent to only 3.3 wt. percent. These results are unsatisfactory. 6FK containing 3.3 wt. percent HCl does not meet commercial standards.

Example 6

This example shows that HF, in admixture with an FK can be converted to HCl in accordance with the optional pretreatment step of the invention.

A crude 6FK mixture obtained from a Cr$_2$O$_3$ catalyzed reaction of HF with hexachloroacetone, having the following composition:

| | Weight percent |
|---|---|
| 6FK | 50 |
| HF | 10 |
| HCl | 40 | is passed upwardly through a column containing pellets of anhydrous CaCl$_2$. Temperature is maintained at about 100° C. Pressure is atmospheric. Contact time is about 200 seconds. At the end of the run, the wt. percent of HF present is reduced from 10% to 1%, whereas the wt. percent of HCl present is increased from 40% to 49%.

We claim:

1. The method for neutralizing halogen acid impurities contained in perhaloacetone mixtures which comprises contacting a mixture containing a perhaloacetone of the formula C$_3$OCl$_{6-x}$F$_x$, wherein $x$ is an integer from 1 to 6 and containing a halogen acid impurity of the formula HY, wherein Y is Cl or F, or mixtures thereof, at temperatures below about 160° C., with a neutralizing agent comprising an alkali or alkaline earth metal salt of a polybasic acid in which salt the last hydrogen ion in the polybasic acid which has been replaced by the metal ion has an ionization constant of between $1.0 \times 10^{-5}$ and $1.0 \times 10^{-11}$, inclusive, to neutralize HY in the mixture and form a reaction mass containing the corresponding HY salt of the neutralizing agent and perhaloacetone.

2. The method of claim 1 in which the perhaloacetone which is purified is a compound of the given formula where $x$ is 4–6 inclusive, or mixtures thereof.

3. The method of claim 2 in which the neutralizing agent is a member selected from the group consisting of Na$_2$CO$_3$, NaHCO$_3$, Na$_2$HPO$_4$, NaBO$_2$, Na$_2$B$_4$O$_7$, Na$_4$P$_2$O$_7$ and Na$_2$SO$_3$.

4. The method of claim 3 in which the neutralizing agent is Na$_2$CO$_3$.

5. The method of claim 4 in which $x$ is 5–6, inclusive, or mixtures thereof, and in which the neutralization is carried out at temperatures between the boiling point of perhaloacetone and about 160° C.

6. The method of claim 4 in which $x$ is 5–6, inclusive, or mixtures thereof, and in which the neutralization is carried out at temperatures between about 50–130° C.

7. The method for neutralizing halogen acid impurities contained in perhaloacetone mixtures which comprises the steps of:

(a) contacting a crude reaction mass containing a perhaloacetone of the formula C$_3$OCl$_{6-x}$F$_x$, wherein $x$ is an integer from 1 to 6 or mixtures thereof, and containing halogen acid impurities of the formula HY wherein Y is Cl or F, or mixtures thereof, with liquid-phase water in an amount equivalent to provide a total of at least 1 mol of water per mol of perhaloacetone, while maintaining temperatures such that any free water present is in liquid phase, to evolve off quantities of HY and form a more purified reaction mass containing recoverable perhaloacetone hydrate; and (b) neutralizing HY in the purified reaction mass by reaction, at temperatures below about 160° C., with a neutralizing agent comprising an alkali metal or alkaline earth metal salt of polybasic acid in which salt the last hydrogen ion in the polybasic acid which has been replaced by the metal ion has an ionization constant of between $1.0 \times 10^{-5}$ and $1.0 \times 10^{-11}$, inclusive, to form a final reaction mass containing the corresponding HY salt of the neutralizing agent and perhaloacetone.

8. The method of claim 7 in which the perhaloacetone which is purified is a compound of the given formula wherein $x$ is 4–6 inclusive, or mixtures thereof.

9. The method of claim 8 in which the neutralizing agent is a member selected from the group consisting of Na$_2$CO$_3$, NaHCO$_3$, Na$_2$HPO$_4$, NaBO$_2$, Na$_2$B$_4$O$_7$, Na$_4$P$_2$O$_7$ and Na$_2$SO$_3$.

10. The method of claim 9 in which the neutralizing agent is Na$_2$CO$_3$.

11. The method of claim 9 in which $x$ is 4 and wherein the recoverable perhaloacetone hydrate described in step (a) has the formula C$_3$OCl$_2$F$_4$·2½H$_2$O.

12. The method of claim 9 in which the purified reaction mass prepared in accordance with step (a) therein, is dehydrated prior to carrying out the neutralization described in step (b).

13. The method of claim 9 in which $x$ is 5–6, inclusive, or mixtures thereof and in which the amount of water which is contacted with the crude reaction mass in accordance with step (a) is such as to provide a molar ratio of water to perhaloacetone present in the crude reaction mass in the range of about 2.8–3.5:1.

14. The method of claim 9 in which $x$ is 4 and in which the amount of water which is contacted with the crude reaction mass in accordance with step (a) is such as to provide a molar ratio of water to perhaloacetone present in the crude reaction mass in the range of 2.3–3.0:1.

15. The method of claim 9 in which the liquid-phase water which is contacted with the crude reaction mass is supplied by adding recoverable perhaloacetone hydrate to the crude reaction mass.

16. The method of claim 9 in which $x$ is 5–6, inclusive, or mixtures thereof, in which recoverable perhaloacetone monohydrate is formed in the purified reaction mass according to step (a) and in which the purified perhaloacetone is recovered from the final reaction mass by disassociating the perhaloacetone monohydrate to perhaloacetone trihydrate and free perhaloacetone.

17. The method for neutralizing halogen acid impurities contained in perhaloacetone mixtures which comprises the steps of:
(a) contacting a crude reaction mass containing a perhaloacetone of the formula $C_3OCl_{6-x}F_x$, wherein $x$ is an integer from 1 to 6 or mixtures thereof, and containing a halogen acid impurity of the formula HY wherein Y is Cl or F, or mixtures thereof, with liquid phase water in an amount equivalent to provide a total of at least 1 mol of water per mol of perhaloacetone, while maintaining temperature such that any free water present is in liquid phase, to evolve off quantities of HY and form a more purified reaction mass containing recoverable perhaloacetone hydrate;
(b) heating the purified reaction mass to a temperature of at least about 70° C. to volatilize therefrom volatilizable constituents which boil below about 105° C. at atmospheric pressure; and
(c) neutralizing HY in the purified reaction mass by reaction, at temperatures below about 160° C., with a neutralizing agent comprising an alkali metal or alkaline earth metal salt of a polybasic acid in which salt the last hydrogen ion in the polybasic acid which has been replaced by the metal ion has an ionization constant of between about $1.0 \times 10^{-5}$ and $1.0 \times 10^{-11}$, inclusive, to form a final reaction mass containing the corresponding HY salt of the neutralizing agent and perhaloacetone.

18. The method for neutralizing halogen acid impurities contained in perhaloacetone mixtures which comprises the steps of:
(a) reacting a crude reaction mass containing a perhaloacetone of the formula $C_3OCl_{6-x}F_x$, wherein $x$ is an integer from 1 to 6 or mixtures thereof, and containing halogen acid impurities of the formula HY wherein Y is Cl or F, or mixtures thereof, with an anhydrous metal chloride to convert a substantial proportion of the HF content therein to HCl;
(b) contacting the resulting reaction mass with liquid-phase water in an amount equivalent to provide a total of at least 1 mol of water per mol of perhaloacetone, while maintaining temperature such that any free water present is in liquid phase, to evolve off quantities of HY and form a more purified reaction mass containing recoverable perhaloacetone hydrate; and
(c) neutralizing HY in the purified reaction mass by reaction, at temperatures below about 160° C., with a neutralizing agent comprising an alkali metal or alkaline earth metal salt of a polybasic acid in which salt the last hydrogen ion in the polybasic acid which has been replaced by the metal ion has an ionization constant of between about $1.0 \times 10^{-5}$ and $1.0 \times 10^{-11}$, inclusive, to form a final reaction mass containing the corresponding HY salt of the neutralizing agent and perhaloacetone.

19. The method of claim 18 in which the perhaloacetone which is purified is a compound of the given formula wherein $x$ is 4–6 inclusive, or mixture thereof.

20. The method of claim 19 in which the neutralizing agent is a member selected from the group consisting of $Na_2CO_3$, $NaHCO_3$, $Na_2HPO_4$, $NaBO_2$, $Na_2B_4O_7$, $Na_4P_2O_7$ and $Na_2SO_3$.

21. The method of claim 19 in which the neutralizing agent is $Na_2CO_3$.

22. The method of claim 19 in which the metal chloride employed is an alkaline earth metal chloride.

23. The method of claim 19 in which the metal chloride employed is $CaCl_2$.

24. The method for neutralizing halogen acid impurities contained in perhaloacetone mixtures which comprises the steps of:
(a) reacting the crude reaction mass with an anhydrous metal chloride to convert a substantial proportion of the HF content therein to HCl;
(b) contacting the resulting reaction mass with liquid-phase water in an amount equivalent to provide a total of at least 1 mol of water per mol of perhaloacetone, while maintaining temperature such that any free water present is in liquid phase, to evolve off quantities of HY and form a more purified reaction mass containing recoverable perhaloacetone hydrate;
(c) heating the purified reaction mass to a temperature of at least about 70° C. to volatilize therefrom volatilizable constituents which boil below 105° C. at atmospheric pressure; and
(d) neutralizing HY in the purified reaction mass by reaction, at temperatures below about 160° C., with a neutralizing agent comprising an alkali metal or alkaline earth metal salt of a polybasic acid in which salt the last hydrogen ion in the polybasic acid which has been replaced by the metal ion has an ionization constant of between about $1.0 \times 10^{-5}$ and $1.0 \times 10^{-11}$, inclusive, to form a final reaction mass containing the corresponding HY salt of the neutralizing agent and perhaloacetone.

25. The method of claim 24 in which the neutralizing agent is a member selected from the group consisting of $Na_2CO_3$, $NaHCO_3$, $Na_2HPO_4$, $NaBO_2$, $Na_2B_4O_7$, $Na_4P_2O_7$ and $Na_2SO_3$.

26. The method of claim 25 in which $x$ is 4 and the neutralizing agent is $Na_2CO_3$.

27. The method of claim 25 in which $x$ is 5–6 inclusive, or mixtures thereof and in which the purified reaction mass prepared in accordance with step (a) therein, is dehydrated prior to carrying out the neutralization described in step (d).

28. The method of claim 27 in which the neutralizing agent is $Na_2CO_3$.

29. The method of claim 27 in which $x$ is 5.

30. The method of claim 27 in which $x$ is 6.

References Cited

UNITED STATES PATENTS 3,351,665  11/1967  Gilbert _____ 260—593H

FOREIGN PATENTS 558,286  5/1943  Great Britain _____ 260—593H

BERNARD HELFIN, Primary Examiner

W. B. LONE, Assistant Examiner

UNITED STATES PATENT OFFICE
CERTIFICATE OF CORRECTION

Patent No. 3,544,633          Dated December 1, 1970

Inventor(s) Anthony W. Yodis, Aubrey W. Michener Jr. and Bela I. Karsay

It is certified that error appears in the above-identified patent and that said Letters Patent are hereby corrected as shown below:

Column 1, lines 59, 60; Column 2, lines 1, 21, 31, 42, 45, 56; Column 3, lines 23, 25, 30, 54, 55, 67, 70, 75; Column 4, lines 20, 57; Column 5, lines 11, 14; Column 7, lines 38, 41; Column 9, lines 26, 44, at each occurrence, "FK's" should read --FKs--

Column 2, line 52, "SK's" should read --FKs--

Column 3, line 19, in the formula,

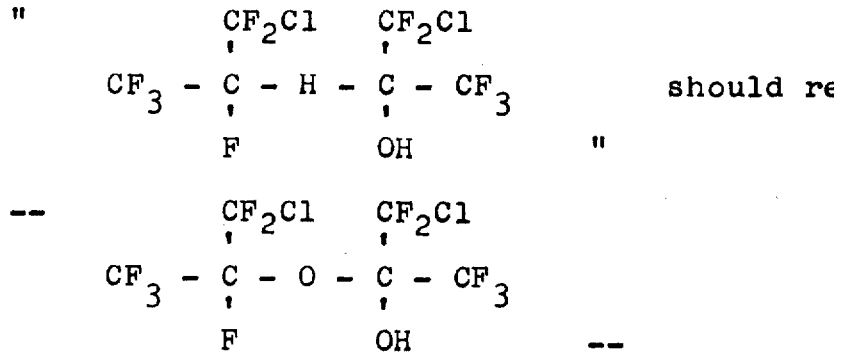

line 54, "purified" should read --purification--

Column 5, line 26, "neutralization" should read --neutralizi

Column 7, Table II, in the heading, "$^6$C." should read --°C.-- in two places (Continued on Page 2

UNITED STATES PATENT OFFICE
CERTIFICATE OF CORRECTION

Patent No. 3,544,633          Dated December 1, 1970

Inventor(s) Anthony W. Yodis, Aubrey W. Michener Jr. and Bela I. Karsay

It is certified that error appears in the above-identified patent and that said Letters Patent are hereby corrected as shown below:

Page 2

Column 7, Table II, last item under the heading "Hydrate", "4FK. 2 1/2H₂O" should read
--4FK· 2-1/2H$_2$O--

Column 8, line 64, "azetotropes" should read --azeotropes--

Column 9, line 3, "4FK·2+1/2H$_2$O" should read --4FK·2-1/2H$_2$O

Column 10, line 54, "RK's" should read --FKs-- line 66, "(4.0 wt. %)" should read --(3.0 wt. %)

Column 12, line 43, "exists" should read --exits--

Column 13, line 32, "FF" should read --HF--

Column 15, line 6,    "p.p.m." should read --p.p.m.*-- and
                    --*p.p.m. - parts per million--
                    should be inserted at end of table line 71, Claim 2, "where" should read --wherein- Column 16, line 5,    Claim 5, --the-- should be inserted aft "of" at end of line line 12, Claim 7, "off" should read --of--

(Continued on Page 3)

UNITED STATES PATENT OFFICE
CERTIFICATE OF CORRECTION

Patent No. 3,544,633         Dated December 1, 1970

Inventor(s) Anthony W. Yodis, Aubrey W. Michener Jr. and Bela I. Karsay

It is certified that error appears in the above-identified patent and that said Letters Patent are hereby corrected as shown below:

Page 3

Column 16, line 28, Claim 7, insert --a-- between "of" and "polybasic"

line 62, Claim 14, insert --about-- after "of"

Column 18, line 4, Claim 21, "19" should read --20-- line 6, Claim 22, "19" should read --20-- line 8, Claim 23, "19" should read --20--

Signed and sealed this 3rd day of August 1971.

(SEAL)
Attest:

EDWARD M. FLETCHER, JR.
Attesting Officer

WILLIAM E. SCHUYLER, JR.
Commissioner of Patents